(12) United States Patent
Kanematsu et al.

(10) Patent No.: US 7,135,139 B2
(45) Date of Patent: Nov. 14, 2006

(54) METHOD AND MOLD ASSEMBLY FOR PRODUCING A MOLDED OBJECT

(75) Inventors: Toshihiro Kanematsu, Atsugi (JP); Yasuo Yamanaka, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 10/759,430

(22) Filed: Jan. 20, 2004

(65) Prior Publication Data

US 2004/0145090 A1    Jul. 29, 2004

Related U.S. Application Data

(62) Division of application No. 09/660,943, filed on Sep. 13, 2000, now Pat. No. 6,702,565.

(30) Foreign Application Priority Data

Sep. 13, 1999 (JP) ................................. 11-258192

(51) Int. Cl.
*B29C 33/22* (2006.01)
*B29C 45/43* (2006.01)
*B29C 45/57* (2006.01)

(52) U.S. Cl. ...................... 264/570; 264/313; 264/316; 264/335; 264/500

(58) Field of Classification Search ................ 264/101, 264/219, 313, 316, 510, 511, 342 R, 500, 264/570, 335
See application file for complete search history.

(56) References Cited

U.S. PATENT DOCUMENTS 3,251,908 A    5/1966  Wilenius et al.
3,733,159 A *  5/1973  Coffman ..................... 425/186
3,844,524 A    10/1974 Fisher et al.
4,284,591 A    8/1981  Neefe
4,447,372 A    5/1984  Kreuttner
4,806,287 A    2/1989  Sulc et al.
4,873,044 A    10/1989 Epel
4,985,186 A    1/1991  Nose et al.
5,603,871 A    2/1997  Koseko et al.
6,015,514 A    1/2000  Koseko
6,287,504 B1 * 9/2001  Kanematsu et al. ........ 264/327
6,793,868 B1 * 9/2004  Kanematsu et al. ........ 264/500
6,919,120 B1 * 7/2005  Yamanaka et al. .......... 428/156

FOREIGN PATENT DOCUMENTS

JP    2686122      7/1990
JP    6-304973     11/1994
JP    11-28745     2/1999

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

A mold assembly for producing a molded object from resin. The assembly includes a cavity configured to be filled with resin to form at least one surface of the molded object into a predetermined shape with at least one transfer surface of the cavity. A molding insertion member is arranged to form another surface of the molded object, and a holding insertion piece is configured to hold the molding insertion member. The holding insertion piece includes a communication path that places a surface of the molding insertion member at a side opposite to the cavity in fluid communication with the exterior of the mold assembly and guides air from the exterior of the mold assembly toward the surface of the molding insertion member.

14 Claims, 5 Drawing Sheets

METHOD AND MOLD ASSEMBLY FOR PRODUCING A MOLDED OBJECT

CROSS-REFERENCE TO RELATED APPLICATIONS

This document claims priority and contains subject matter related to Japanese Patent Application No.11-258192 filed in the Japanese Patent Office on Sep. 13, 1999, the entire contents of which being incorporated by reference.

BACKGROUND OF THE INVENTION

1. Field of the Invention

The present invention relates to a method and mold assembly for producing a molded object of plastic optical elements such as a lens, a mirror, and a prism.

2. Discussion of the Background

Metallic mold assemblies that employ an injection molding method to produce plastic optical elements such as plastic lenses with high accuracy are known. Known methods of producing a molded object 21 of a plastic optical element using a mold assembly 1 are shown in FIGS. 8A through 8C. As illustrated in FIG. 7, the molded object 21 has mirror surfaces 22 and 23 as optical surfaces, as well as non-optical surfaces 24 and 25. Referring to FIG. 8A, the mold assembly 1 includes a fixing-side metallic mold 2 providing a cavity piece 8 (i.e., a molding piece for forming a cavity) and a moving-side metallic mold 3 providing a cavity piece 9. The cavity pieces 8 and 9 have transfer surfaces 8a and 9a, respectively. A pair of porous members 26 is arranged opposing each other in the mold assembly 1. A cavity, which is filled with molten resin during molding, is defined by the cavity pieces 8 and 9 and the porous members 26. After the molten resin is loaded into the cavity, the molten resin is cooled under a controlled pressure. In the cooling process, when air is guided to the cavity via the porous members 26, the sides of the resin in the cavity corresponding to the non-optical surfaces 24 and 25 of the molded object 21 are pressed. This presses the resin in the cavity against the transfer surfaces 8a and 9a. As a result, the transfer surfaces 8a and 9a are transferred to the resin, and thereby the mirror surfaces 22 and 23 of the molded object 21 are formed.

In another mold assembly 1 illustrated in FIG. 8B, a vent hole 27 is provided at a side surface other than the transfer surfaces 8a and 9a in the cavity. Furthermore, a communication path 28 is provided to place the vent hole 27 in fluid communication with the exterior of the mold assembly 1. When the molten resin is loaded into the cavity, the communication path 28 is filled with compressed air in the cavity. Then, a differential pressure is generated between portions of the resin contacting the transfer surfaces 8a/9a and a portion of the resin contacting the vent hole 27. This forms a sink only at the portions of the resin that contact the vent hole 27. Thereby, a sink can be prevented from occurring at the mirror surfaces 22 and 23 of the molded object 21.

In still another background mold assembly 1 illustrated in FIG. 8C, a slide cavity piece 29 is provided to form a side surface of the cavity other than the transfer surfaces 8a and 9a. When the molten resin in the cavity is cooled to a temperature lower than a softening point of the resin, a gap 30 is forcibly formed between the resin and the slide cavity piece 29. This is done by sliding the slide cavity piece 29 in a direction away from the resin so as to form a sink only at a portion of the resin facing the gap 30. Thereby, a sink is prevented from occurring at the mirror surfaces 22 and 23 of the molded object 21.

In the above-described mold assembly 1, the molded object 21 of a highly accurate optical element can be obtained by forming a sink in a portion of the molded object 21 other than mirror surfaces 22 and 23 which are to be used as optical surfaces. This allows mirror surfaces 22 and 23 to be shaped by transfer surfaces 8a and 9a. This is further accomplished by reducing internal distortion of the molded object 21. However, because a portion of the resin where the sink is formed is separated from a piece of the mold assembly 1 at a temperature above the softening point of the resin, the thermal conductivity of the above-described portion of the resin where the sink is formed becomes extremely low. As a result, a significant cooling time is required to cool the resin.

Furthermore, when the sink is formed asymmetrically at a surface of the cavity other than transfer surfaces 8a and 9a as illustrated in FIGS. 8B and 8C, the temperature distribution of the resin becomes uneven. This is because the temperature of the portion of the resin where the sink is formed is relatively high and the temperature of other portions of the resin is relatively low. As a result, after the molded object 21 is removed from the mold assembly 1, the molded object 21 may deform due to differences in contraction rates. In order to prevent the deformation of the molded object 21, it is necessary to sufficiently cool the resin and to lower the temperature of the molded object 21 before removing the molded object 21 from the mold assembly 1. However, the process of cooling the resin requires a significant amount of time.

Furthermore, in the mold assembly 1 illustrated in FIG. 8C, when the slide cavity piece 29 is slid away from the resin, the molded object 21 may be deformed due to a change in the contact-force between the slide cavity piece 29 and the resin during the process of cooling the resin to a temperature lower than a softening point of the resin.

SUMMARY OF THE INVENTION

The present invention has been made in view of the above-discussed and other problems, and an object of the present invention is to address these and other problems.

The present invention provides a novel method and mold assembly for producing a molded object with a high accuracy wherein a time of cooling a resin can be reduced.

The present invention also provides a novel method and mold assembly for producing a molded object with a high accuracy wherein deformation of the molded object can be prevented.

These and other objects are achieved according to the present invention by providing and using a novel mold assembly for molding a resin. The novel mold assembly includes a cavity configured to be filled with resin so as to form at least one surface of the molded object into a predetermined shape with at least one transfer surface of the cavity, a molding insertion member arranged to form another surface of the molded object other than the surface formed in the predetermined shape by the at least one transfer surface of the cavity, and a holding insertion piece configured to hold the molding insertion member. The holding insertion piece includes a communication path that places a surface of the molding insertion member at a side opposite to the cavity in fluid communication with the exterior of the mold assembly. This is done to guide atmospheric air outside of the mold assembly toward the surface of the molding insertion member. When the resin in the cavity is cooled, the resin in the cavity shrinks and a pressure in the cavity becomes lower than a pressure of the atmospheric air guided through the communication path in the holding insertion piece. Thus, atmospheric air is drawn into the communication path toward the molding insertion member. This deflects the molding insertion member toward the cavity so as to form a sink at the other surface of the molded object and presses the at least one surface of the molded object against the at least one transfer surface of the cavity.

According to an embodiment of the present invention, a mold assembly for molding a resin, and a method of using the mold assembly, are described. The mold assembly includes a cavity configured to be filled with resin so as to form at least one surface of the molded object in a predetermined shape with at least one transfer surface of the cavity, a molding insertion member arranged so as to form another surface of the molded object other than the surface formed in the predetermined shape by the at least one transfer surface of the cavity, and a holding insertion piece configured to hold the molding insertion member. The mold assembly further includes another insertion piece that is provided inside the holding insertion member. This another insertion piece is configured to include at least one communication path that places a surface of the molding insertion member at a side opposite in fluid communication with a cavity side and the exterior of the mold assembly. The other insertion piece is configured to move slidably relative to the holding insertion piece in a direction away from the molding insertion member so as to lower the pressure in the cavity below the pressure of one of air, a pressurized fluid, or fluid for cooling the resin guided through the communication path. This draws the air, pressurized fluid, or fluid for cooling the resin into the communication path toward the molding insertion member. When the resin in the cavity is cooled (by moving the other insertion piece in a direction away from the molding insertion member so as to lower the pressure in the cavity below that of the pressure of air, pressure fluid, or fluid for cooling the resin) the air, pressurized fluid, or fluid for cooling the resin is drawn into the communication path toward the molding insertion member such that the molding insertion member is deflected toward the cavity. This forms a sink at the other surface of the molded object and brings the at least one surface of the molded object into tight contact with the at least one transfer surface of the cavity.

According to another embodiment of the present invention, another mold assembly for producing a molded object of resin, and a method for using the mold assembly, are described. The mold assembly includes a cavity configured to be filled with resin so as to form at least one surface of the molded object in a predetermined shape with at least one transfer surface of the cavity, and a molding insertion member arranged so as to form another surface of the molded object other than the surface formed in the predetermined shape by the at least one transfer surface of the cavity. The molding insertion member has a property of restoring to an original shape, and includes a convex portion protruding toward the cavity. When the resin is filled in the cavity, the molding insertion member is deformed and pressed by the filled-in resin such that the convex portion of the molding insertion member is substantially flat. As the resin in the cavity shrinks in a process of cooling the resin, the molding insertion member restores the convex portion so as to form a sink at the other surface of the molded object. This brings the at least one surface of the molded object into tight contact with the at least one transfer surface of the cavity.

According to yet another embodiment of the present invention, a mold assembly for producing a molded object from resin, and a method of using such a mold assembly, are described. The assembly includes a cavity configured to be filled with resin so as to form at least one surface of the molded object in a predetermined shape with at least one transfer surface of the cavity, and a molding insertion member arranged so as to form another surface of the molded object other than the surface formed in the predetermined shape by the at least one transfer surface of the cavity. The molding insertion member has a property of restoring to an original shape. The mold assembly further includes a holding insertion piece configured to hold the molding insertion member. The holding insertion piece includes a concave portion having a predetermined size at a surface thereof that contacts the molding insertion member. When the resin is loaded into the cavity, the molding insertion member is deformed and pressed by the loaded resin, according to a shape of the concave portion. As the resin in the cavity shrinks during cooling of the resin, the molding insertion member is restored so as to press the resin in the cavity to bring the at least one surface of the molded object into tight contact with the at least one transfer surface of the cavity.

One embodiment of a method for using an above-described mold assembly starts with filling a cavity of a mold assembly with resin to form at least one surface of the molded object into a predetermined shape with at least one transfer surface of the cavity. The resin is then cooled in the cavity to solidify the resin, and a fluid is drawn through a communication path that places a surface of a molding insertion member at a side opposite to the cavity in fluid communication with an exterior of the mold assembly when the resin in the cavity is cooled, the resin in the cavity shrinks, and a pressure in the cavity becomes lower than a pressure of the fluid, said drawn fluid deflecting the molding insertion member toward the cavity to form a sink at the other surface of the molded object and to press the at least one surface of the molded object against the at least one transfer surface of the cavity.

Another embodiment of a method for using an above-described mold assembly again starts with filling a cavity of a mold assembly with resin to form at least one surface of the molded object into a predetermined shape with at least one transfer surface of the cavity. Then the resin filled in the cavity is cooled to solidify the resin. Next, one of air, a pressurized fluid, and a cooling fluid is drawn into the mold assembly, the drawing done in a direction toward a molding insertion member that forms another surface of the molded object and through at least one communication path that places a surface of the molding insertion member at a side opposite to the cavity in fluid communication with an exterior of the mold assembly. The drawing includes moving another insertion piece in a direction away from the molding insertion member such that the molding insertion member is deflected toward the cavity, forms a sink at the other surface of the molded object, and presses the at least one surface of the molded object against the at least one transfer surface of the cavity.

Another embodiment of a method for using an above-described mold assembly again starts with filling a cavity of a mold assembly with resin. This filling step includes forming at least one surface of the molded object into a predetermined shape with at least one transfer surface of the cavity and deforming a molding insertion member such that a convex portion of the molding insertion member is substantially flat, the molding insertion member forming another surface of the molded object and, prior to said deforming step, including the convex portion protruding toward the cavity. After filling, the convex portion of the molding insertion member restores so as to form a sink at the other surface of the molded object. This restoring step includes cooling the resin filled in the cavity to solidify and shrink the resin, and pressing the at least one surface of the molded object against the at least one transfer surface of the cavity.

Another embodiment of a method for using an above-described mold assembly again starts with filling a cavity of a mold assembly with resin. This filling step includes forming at least one surface of the molded object into a predetermined shape with at least one transfer surface of the cavity, and deforming a molding insertion member into a shape of a concave portion of a holding insertion piece that holds the molding insertion member, the molding insertion member forming another surface of the molded object. Thereafter, the molding insertion member is restored. This restoring step includes cooling the resin filled in the cavity to solidify and shrink the resin, and pressing the resin in the cavity using the restored molding insertion member such that the at least one surface of the molded object is pressed against the at least one transfer surface of the cavity.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
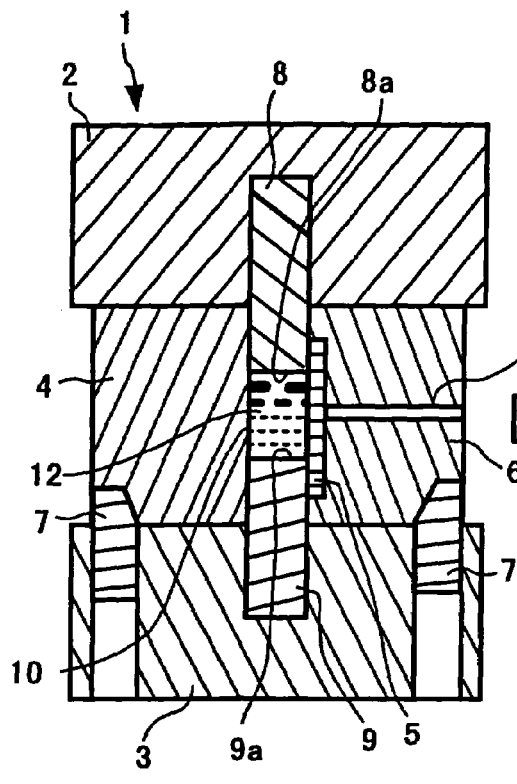
FIG. 1A is a sectional view of a mold assembly according to a first embodiment of the present invention when a resin is loaded into a cavity of the mold assembly.

Embodiments of the present invention are described in detail referring to the drawings, wherein like reference numerals designate identical or corresponding parts throughout the several views. For the sake of clarity, members having substantially the same functions as those used in the known mold assemblies are designated with the same reference number.

Figure 1B:
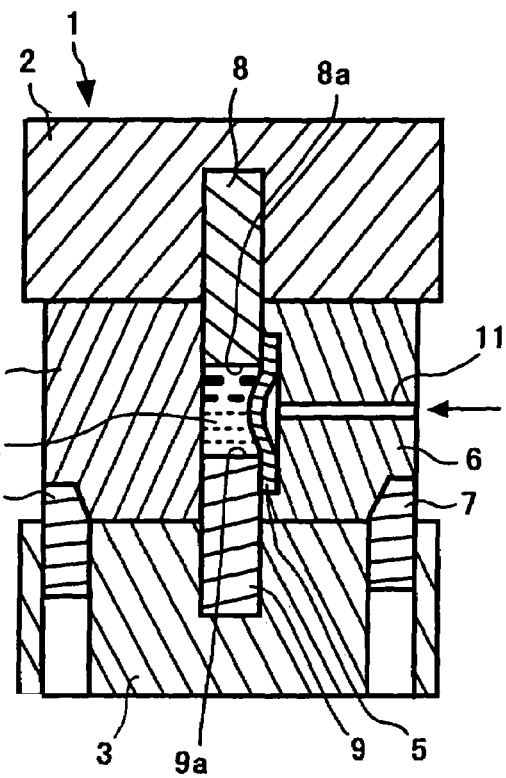
FIG. 1B is a sectional view of the mold assembly of the first embodiment of the present invention when the resin in the cavity of the mold assembly is cooled.
Figure 7:
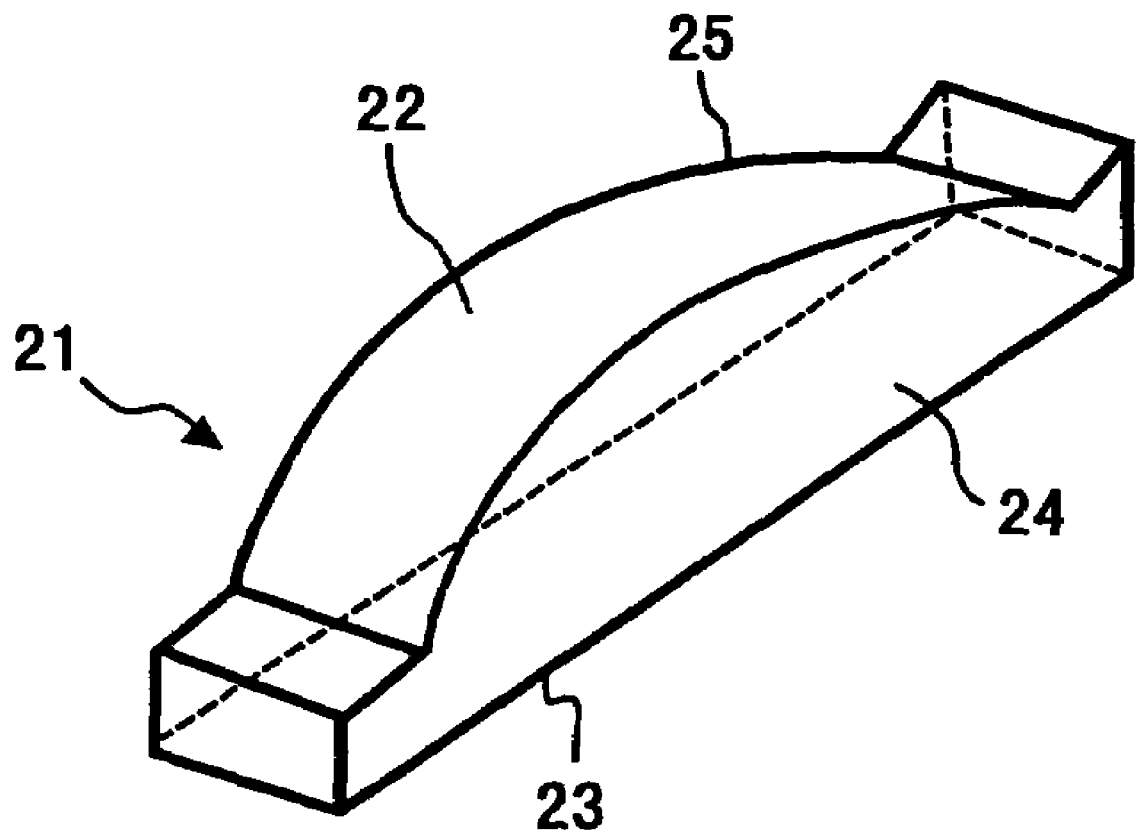
FIG. 7 is a perspective view of a molded plastic optical element.
Figure 8A:
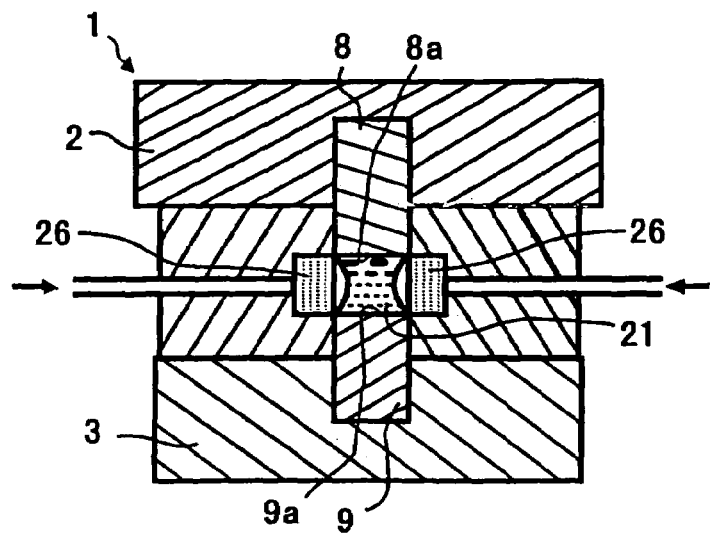
FIGS. 8A through 8C are sectional views of background mold assemblies.
Figure 8B:
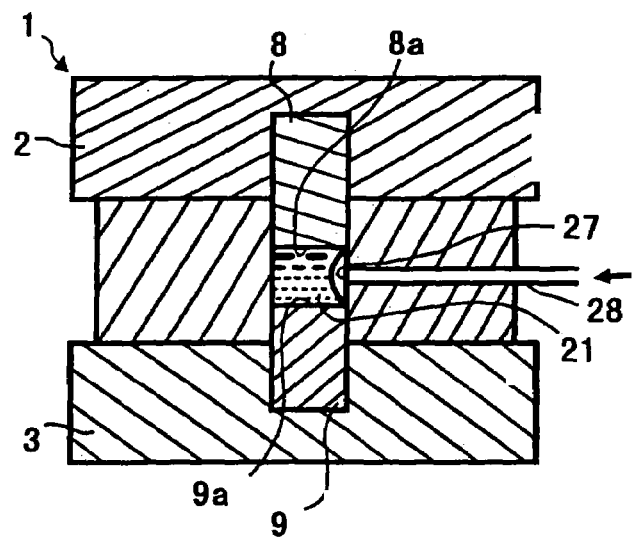
Figure 8C:
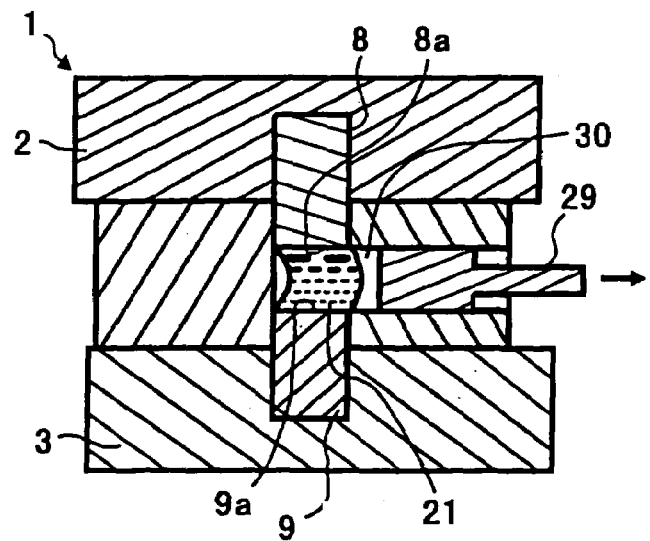

A first embodiment of the present invention is described referring to FIGS. 1A and 1B, and FIG. 7. A mold assembly 1 for producing the molded object 21 such as the plastic optical element illustrated in FIG. 7 is described. The mold assembly 1 includes a fixing-side metallic mold 2, a moving-side metallic mold 3, an insertion piece 4 for forming a standard surface of the molded object 21 at an installation side, a molding insertion member 5, a holding insertion piece 6, and locking blocks 7. At the side of the fixing-side metallic mold 2, the mold assembly 1 further includes a cavity piece 8 (i.e., a molding piece for forming a cavity) that has a transfer surface 8a for transferring a mirror surface onto resin 12 (i.e., the mirror surface 22 of the molded object 21 is formed with the transfer surface 8a). At the side of the moving-side metallic mold 3, the mold assembly 1 further includes a cavity piece 9 that has a transfer surface 9a for transferring a mirror surface onto the resin 12 (i.e., the mirror surface 23 of the molded object 21 is formed with the transfer surface 9a). A cavity 10 of a predetermined volume is formed by the transfer surfaces 8a and 9a, a side surface of the insertion piece 4, and a side surface of the molding insertion member 5. The molding insertion member 5 is made of a material having flexibility, a high heat resistance, and a high thermal conductivity, such as, for example, a thin metallic plate of iron, or a thin plate of a mixture of metallic particles and binder having plasticity such as, for example, silicone resin. The thickness of the molding insertion member 5 is set according to an area of the molding insertion member 5 that contacts the resin filled in the cavity 10. When the above-described area of the molding insertion member 5 that contacts the resin in the cavity 10 is relatively large, a thin plate of about 3 mm in thickness or overlaid thin plates wherein each plate has a thickness of 1 mm or less may be used for the molding insertion member 5. When the above-described area of the molding insertion member that contacts the resin in the cavity 10 measures about 130 mm by about 40 mm, an iron plate of about 0.1 mm in thickness can be used for the molding insertion member 5. The holding insertion piece 6 is configured to hold the molding insertion member 5 and includes a communication path 11 that places the surface of the molding insertion member 5 at a side opposite to a cavity 10 side in fluid communication with the exterior of the mold assembly 1.

Next, the production of the molded object 21 (such as a plastic optical element) with the mold assembly 1 is described. First, as illustrated in FIG. 1A, a molten resin 12 is loaded into the cavity 10 and is then cooled and solidified. When the molten resin 12 in the cavity 10 is cooled, the molten resin 12 in the cavity 10 shrinks and a pressure in the cavity 10 becomes lower than the pressure of atmospheric air guided through the communication path 11 in the holding insertion piece 6. Thus, atmospheric air is drawn into the communication path 11 toward the molding insertion member 5. As a result, as illustrated in FIG. 1B, the molding insertion member 5 is deflected toward the cavity 10, and a sink is formed in the solidified resin 12 at the surface thereof that contacts the molding insertion member 5. Thereby, the resin 12 in the cavity 10 is brought into tight contact with the transfer surfaces 8a and 9a. Due to the fact that the portion of the resin 12 where the sink is formed contacts the molding insertion member 5 which is made of a material possessing a high thermal conductivity, the temperature of the portion of the resin 12 where the sink is formed can be lowered to the same extent as the temperature of other portions of the resin 12. Therefore, the temperature distribution of the resin 12 in the cavity 10 can be even. As a result, the temperature distribution of the molded object 21 is uniform when the molded object 21 is removed from the mold assembly 1. Thus, deformation of the molded object 21 caused by differences in contraction rate can be prevented. Thereby, the molded object 21 such as a plastic optical element can be adequately produced with high accuracy.

As described above, when the molten resin 12 in the cavity 10 is cooled, the molten resin 12 in the cavity 10 shrinks and the pressure in the cavity 10 becomes lower than the pressure of atmospheric air guided through the communication path 11 in the holding insertion piece 6. Thus, atmospheric air is drawn into the communication path 11 toward the molding insertion member 5 and the molding insertion member 5 is deflected toward the cavity 10. Alternatively, pressurized fluid can be injected through the communication path 11 toward the molding insertion member 5 during the process of cooling the resin 12. Thereby, the molding insertion member 5 is firmly deflected toward the cavity 10, so that a sink is formed in the solidified resin 12 at the surface that contacts the molding insertion member 5. Thus, the resin 12 in the cavity 10 is brought into tight contact with the transfer surfaces 8a and 9a.

Figure 2A:
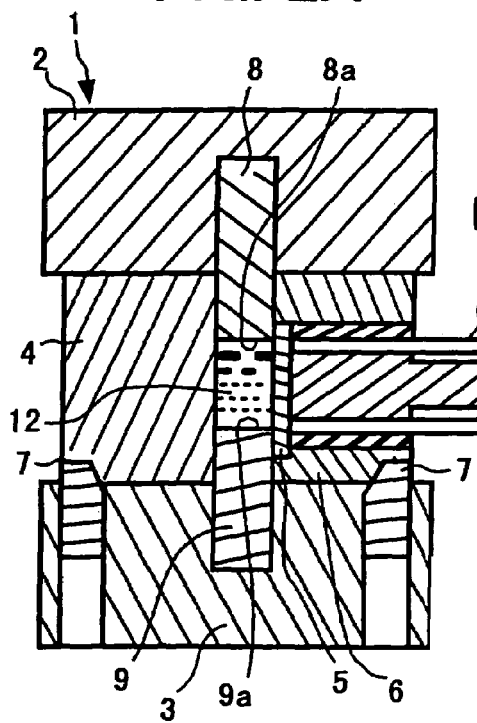
FIG. 2A is a sectional view of a mold assembly according to a second embodiment of the present invention when a resin is loaded into a cavity of the mold assembly.
Figure 2B:
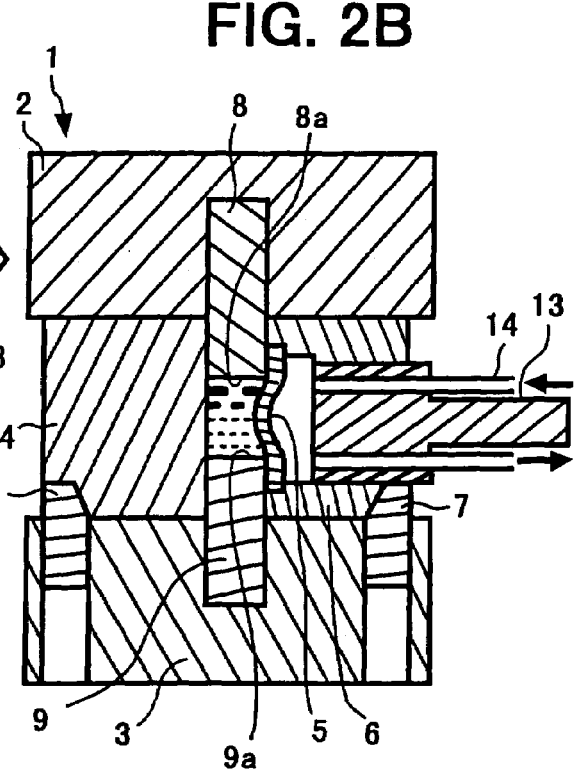
FIG. 2B is a sectional view of the mold assembly of the second embodiment of the present invention when the resin in the cavity of the mold assembly is cooled.

The mold assembly 1 according to a second embodiment of the present invention is described. In the above-described mold assembly 1 according to the first embodiment, the holding insertion piece 6 is made unmovable when the resin 12 is loaded into the cavity 10 and cooled. In the second embodiment of the present invention, as illustrated in FIG. 2A, a slidable insertion piece 13 is provided at the center portion of the holding insertion piece 6 and includes communication paths 14. The communication paths 14 place the surface of the molding insertion member 5 at a side opposite to a cavity 10 side in fluid communication with the exterior of the mold assembly 1. As illustrated in FIG. 2B, when the resin 12 in the cavity 10 is cooled, by moving the insertion piece 13 in the direction away from the molding insertion member 5 so as to lower the pressure in the cavity 10 below the pressure of air guided through the communication path 14, air is drawn into the communication path 14 toward the molding insertion member 5. As a result, the molding insertion member 5 is firmly deflected toward the cavity 10, and a sink is formed in the solidified resin 12 at the surface that contacts the molding insertion member 5. Thereby, the resin 12 in the cavity 10 is brought into tight contact with the transfer surfaces 8a and 9a. In the mold assembly 1 according to the second embodiment of the present invention, a contact-force between the insertion piece 13 and the molding insertion member 5 is much smaller than a contact-force between the resin 12 in the cavity 10 and the molding insertion member 5. So, when the insertion piece 13 is moved in the direction away from the molding insertion member 5, the insertion piece 13 is separated from the molding insertion member 5 but the molding insertion member 5 remains to be in tight contact with the resin 12 in the cavity 10. Therefore, deformation of the resin 12 in the cavity 10 caused by moving the insertion piece 13 in the direction away from the molding insertion member 5 can be prevented, so that the molded object 21 having a stabilized shape can be produced.

As an alternative to guiding air through the communication path 14, a pressurized fluid can be injected through the communication path 14 toward the molding insertion member 5. Furthermore, fluid for cooling the resin 12, such as air, water, oil, and etc. can be injected through the communication path 14 when the resin 12 in the cavity 10 is cooled and the insertion piece 13 is moved in the direction separating from the molding insertion member 5. By injecting the fluid for cooling the resin 12 through the communication path 14 toward the molding insertion member 5, the resin 12 in the cavity 10 can be effectively cooled and solidified, and the time for cooling the resin 12 can be shorten.

Figure 3A:
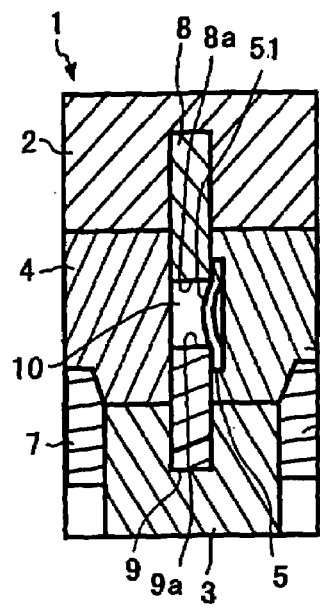
FIG. 3A is a sectional view of a mold assembly according to a third embodiment of the present invention before a resin is loaded into a cavity of the mold assembly.
Figure 3B:
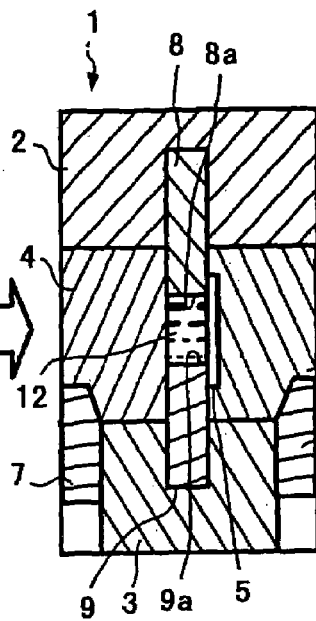
FIG. 3B is a sectional view of the mold assembly of the third embodiment of the present invention after the resin is loaded into the cavity of the mold assembly.
Figure 3C:
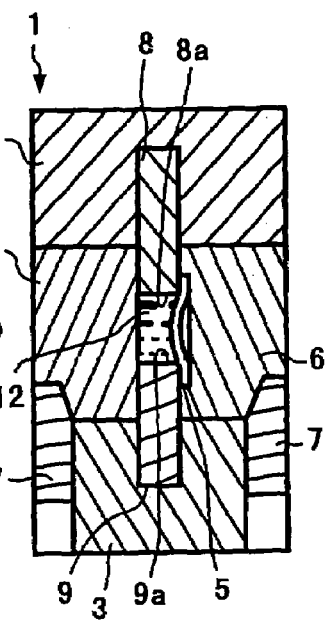
FIG. 3C is a sectional view of the mold assembly of the third embodiment of the present invention when the resin in the cavity of the mold assembly is cooled.

The mold assembly 1 according to a third embodiment of the present invention is described. As illustrated in FIG. 3A, the molding insertion member 5 includes a convex portion 51 protruding toward the cavity 10. The molding insertion member 5 in the third embodiment of the present invention has a property of restoring to an original shape, and is made of a metallic plate of such as, for example, steel, stainless steel, phosphor bronze, and etc. When the resin 12 is loaded into the cavity 10, the molding insertion member 5 is deformed. The molding insertion member 5 is pressed by the filled-in resin 12 such that the convex portion 51 of the molding insertion member 5 is substantially flat as illustrated in FIG. 3B. As the resin 12 in the cavity 10 shrinks during cooling of the resin 12, the molding insertion member 5 restores the convex portion 51 as illustrated in FIG. 3C, and a sink is formed in the solidified resin 12 at the surface thereof that contacts the molding insertion member 5. With the above-described simple configuration of the mold assembly 1, the mirror surfaces 22 and 23 of the molded object 21 can be adequately formed with high accuracy by bringing the resin 12 in the cavity 10 into tight contact with the transfer surfaces 8a and 9a.

Figure 4A:
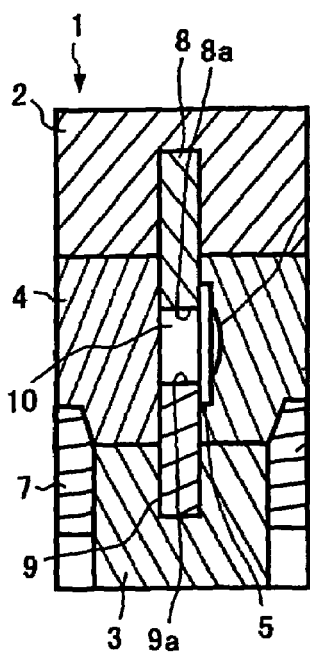
FIG. 4A is a sectional view of a mold assembly according to a fourth embodiment of the present invention before a resin is loaded into a cavity of the mold assembly.
Figure 4B:
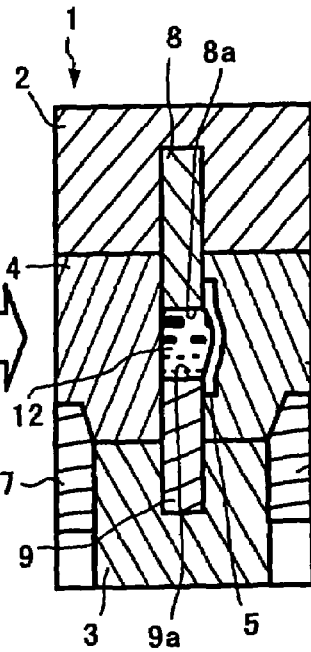
FIG. 4B is a sectional view of the mold assembly of the fourth embodiment of the present invention after the resin is loaded into the cavity of the mold assembly.
Figure 4C:
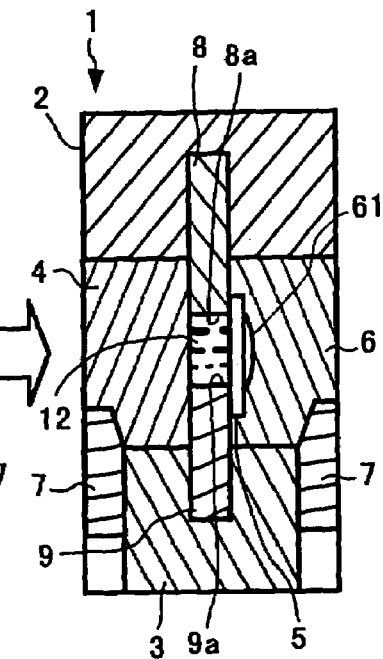
FIG. 4C is a sectional view of the mold assembly of the fourth embodiment of the present invention when the resin in the cavity of the mold assembly is cooled.

The mold assembly 1 according to a fourth embodiment of the present invention is described. As illustrated in FIG. 4A, the holding insertion piece 6 includes a concave portion 61 having a predetermined size at a surface that contacts the molding insertion member 5. The molding insertion member 5 in the fourth embodiment of the present invention has also a property of restoring to an original shape, and is made of a metallic plate of such as, for example, steel, stainless steel, phosphor bronze, and etc. When the resin 12 is loaded into the cavity 10, the molding insertion member 5 is deformed according to a shape of the concave portion 61. The molding insertion member 5 is thus pressed by the loaded resin 12 as illustrated in FIG. 4B. As the resin 12 in the cavity 10 shrinks during cooling of the resin 12, the molding insertion member 5 is restored as illustrated in FIG. 4C and presses the resin 12 in the cavity 10 at its restoring force. This brings the resin 12 in the cavity 10 into tight contact with the transfer surfaces 8a and 9a. Thus, the mirror surfaces 22 and 23 of the molded object 21 can be adequately formed with high accuracy.

Figure 5A:
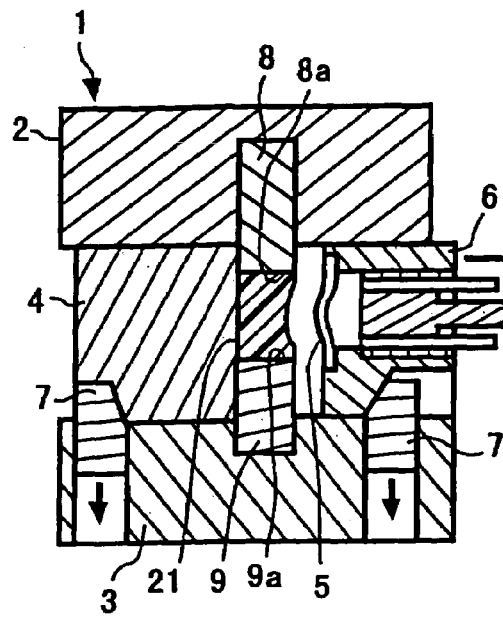
FIG. 5A is a sectional view of a mold assembly of the present invention when locking blocks are moved down to separate a molding insertion member from a molded object.
Figure 5B:
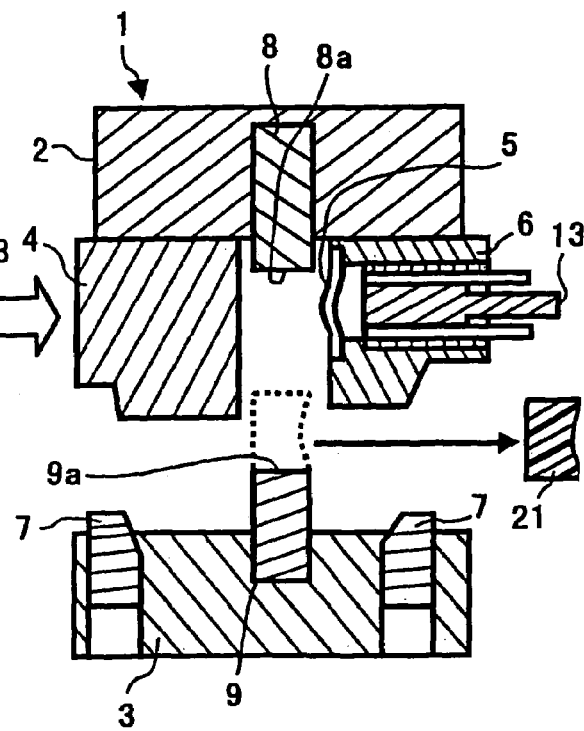
FIG. 5B is a sectional view of the mold assembly of FIG. 5A when a moving-side metallic mold is moved to remove the molded object from the mold assembly.

When the moving-side metallic mold 3 is moved to remove the produced molded object 21 from the mold assembly 1, a considerable separation resistance occurs between the molding insertion member 5 and the molded object 21 which moves together with the moving-side metallic mold 3. Because the molding insertion member 5 is made of a thin plate, there is a fear of breaking the molding insertion member 5 caused by the above-described separation resistance. In the mold assembly 1 according to the first through fourth embodiments of the present invention, locking blocks 7 are provided to lock and unlock the insertion piece 4 and the holding insertion piece 6. When the molded object 21 is removed from the mold assembly 1, the locking blocks 7 are lowered. This unlocks the insertion piece 4 and the holding insertion piece 6 as illustrated in FIG. 5A. By moving the holding insertion piece 6 together with the molding insertion member 5 in a direction away from the molded object 21 in the cavity 10, the molding insertion member 5 can be separated from a surface of the molded object 21. Subsequently, by moving the moving-side metallic mold 3 as illustrated in FIG. 5B, the molded object 21 can be removed from the mold assembly 1 without causing injury to the molding insertion member 5 and the molded object 21.

Figure 6:
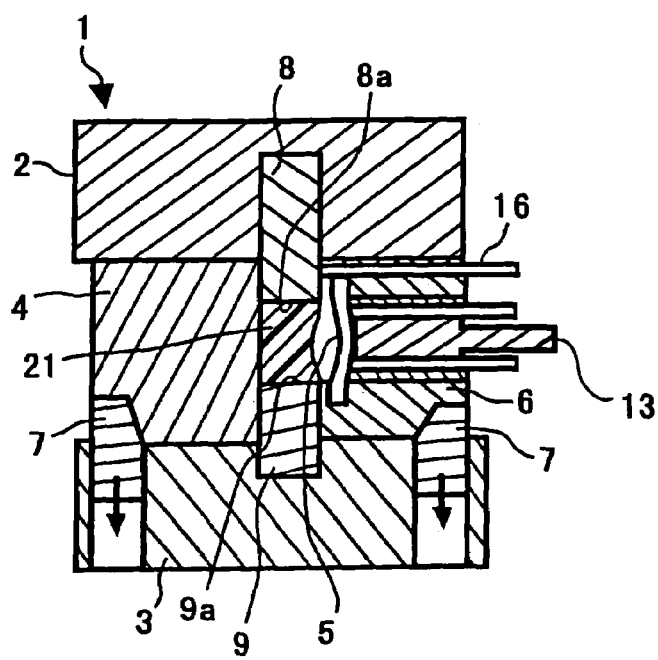
FIG. 6 is a sectional view of a mold assembly of the present invention when fluid is injected through a fluid guide path between a molding insertion member and a molded object to further separate the molding insertion member from the molded object.

Further, as illustrated in FIG. 6, the holding insertion piece 6 may include a fluid guide path 16. When the holding insertion piece 6 is moved in the direction away from the molded object 21, fluid is injected between the molding insertion member 5 and the molded object 21. Thereby, the molded object 21 can be further separated from the molding insertion member 5 without injuring the molding insertion member 5 and the molded object 21.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A method of producing a molded object, comprising steps of:
   filling a cavity of a mold assembly with resin so as to form at least one surface of the molded object in a predetermined shape with at least one transfer surface of the cavity; and
   cooling the resin filled in the cavity so as to solidify the resin;
   wherein when the resin in the cavity is cooled, as the resin in the cavity shrinks and a pressure in the cavity becomes lower than a pressure of an atmospheric air guided through a communicating path communicating with a surface of a molding insertion member that forms another surface of the molded object other than the surface formed in the predetermined shape by the at least one transfer surface of the cavity, at a side opposite to a cavity side and outside of the mold assembly, the atmospheric air is sucked into the communicating path toward the molding insertion member and the molding insertion member is deformed toward the cavity so as to form a sink at the another surface of the molded object and to bring the at least one surface of the molded object into tight contact with the at least one transfer surface of the cavity.

2. The method according to claim 1, further comprising a step of injecting pressure fluid through the communicating path so as to further deform the molding insertion member.

3. The method according to claim 1, further comprising a step of injecting fluid for cooling the resin through the communicating path so as to further deform the molding insertion member.

4. A method of producing a molded object, comprising steps of:
   filling a cavity of a mold assembly with resin so as to form at least one surface of the molded object in a predetermined shape with at least one transfer surface of the cavity;
   cooling the resin filled in the cavity so as to solidify the resin;
   sucking into the molded object assembly either one of air, pressure fluid, and fluid for cooling the resin toward a molding insertion member, that forms another surface of the molded object other than the surface formed in the predetermined shape by the at least one transfer surface of the cavity, through at least one communicating path, that communicates with a surface of the molding insertion member at a side opposite to a cavity side and outside of the mold assembly, by moving another insertion piece in a direction separating from the molding insertion member such that the molding insertion member is deformed toward the cavity so as to form a sink at the another surface of the molded object and to bring the at least one surface of the molded object into tight contact with the at least one transfer surface of the cavity.

5. A method of producing a molded object, comprising steps of:
   filling a cavity of a mold assembly with resin so as to form at least one surface of the molded object in a predetermined shape with at least one transfer surface of the cavity and to deform a molding insertion member, that forms another surface of the molded object other than the surface formed in the predetermined shape by the at least one transfer surface of the cavity and that has a first shape including a convex portion protruding toward the cavity, such that the molding insertion portion is deformed to a second shape where the convex portion of the molding insertion member is substantially flat;
   by cooling the resin filled in the cavity so as to solidify and shrink the resin, restoring the first shape including the convex portion of the molding insertion member so as to form a sink at the another surface of the molded object and to bring the at least one surface of the molded object into tight contact with the at least one transfer surface of the cavity.

6. A method of producing a molded object, comprising steps of:
   filling a cavity of a mold assembly with resin so as to form at least one surface of the molded object in a predetermined shape with at least one transfer surface of the cavity and to deform a molding insertion member, that forms another surface of the molded object other than the surface formed in the predetermined shape by the at least one transfer surface of the cavity, from a first shape to a second shape corresponding to a concave portion of a holding insertion piece that holds the molding insertion member;

by cooling the resin filled in the cavity so as to solidify and shrink the resin, restoring the molding insertion member to the first shape such that the resin in the cavity is pressed by the restored molding insertion member so as to press the resin in the cavity to bring the at least one surface of the molded object into tight contact with the at least one transfer surface of the cavity.

7. The method according to claim 1, further comprising a step of unlocking a locking block that locks and unlocks a holding insertion piece for holding the molding insertion member for taking out the holding insertion piece, the molding insertion member, and the molded object from the mold assembly.

8. The method according to claim 4, further comprising a step of unlocking a locking block that locks and unlocks a holding insertion piece for holding the molding insertion member for taking out the holding insertion piece, the molding insertion member, and the molded object from the mold assembly.

9. The method according to claim 5, further comprising a step of unlocking a locking block that locks and unlocks a holding insertion piece for holding the molding insertion member for taking out the holding insertion piece, the molding insertion member, and the molded object from the mold assembly.

10. The method according to claim 6, further comprising a step of unlocking a locking block that locks and unlocks a holding insertion piece for holding the molding insertion member for taking out the holding insertion piece, the molding insertion member, and the molded object from the mold assembly.

11. The method according to claim 7, further comprising a step of injecting fluid between the molding insertion member and the molded object through a fluid guiding path that is provided in the holding insertion piece so as to separate the molding insertion member from the molded object.

12. The method according to claim 8, further comprising a step of injecting fluid between the molding insertion member and the molded object through a fluid guiding path that is provided in the holding insertion piece so as to separate the molding insertion member from the molded object.

13. The method according to claim 9, further comprising a step of injecting fluid between the molding insertion member and the molded object through a fluid guiding path that is provided in the holding insertion piece so as to separate the molding insertion member from the molded object.

14. The method according to claim 10, further comprising a step of injecting fluid between the molding insertion member and the molded object through a fluid guiding path that is provided in the holding insertion piece so as to separate the molding insertion member from the molded object.

* * * * *